Oct. 25, 1966  W. C. SCHUMACHER  3,281,005
SURFACE METAL RACEWAY FITTINGS
Filed Jan. 21, 1963
2 Sheets-Sheet 1
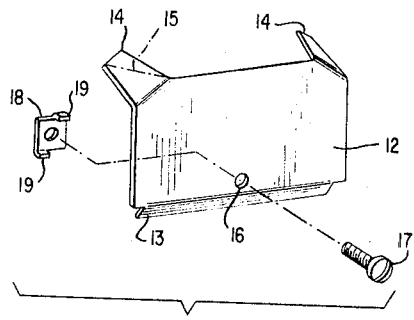
FIG.2
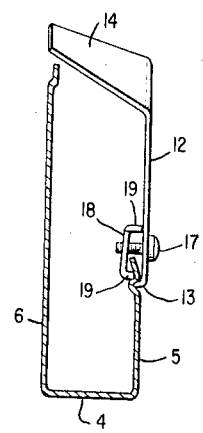
FIG.3
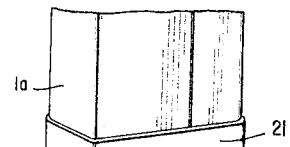
FIG.1
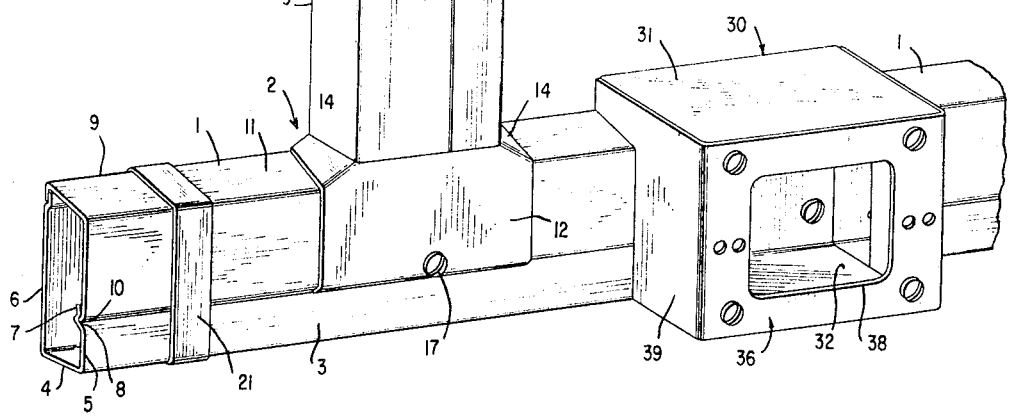
INVENTOR.
WALTER C. SCHUMACHER
BY
Allard A. Braddock
ATTORNEY Oct. 25, 1966  W. C. SCHUMACHER  3,281,005
SURFACE METAL RACEWAY FITTINGS
Filed Jan. 21, 1963  2 Sheets-Sheet 2
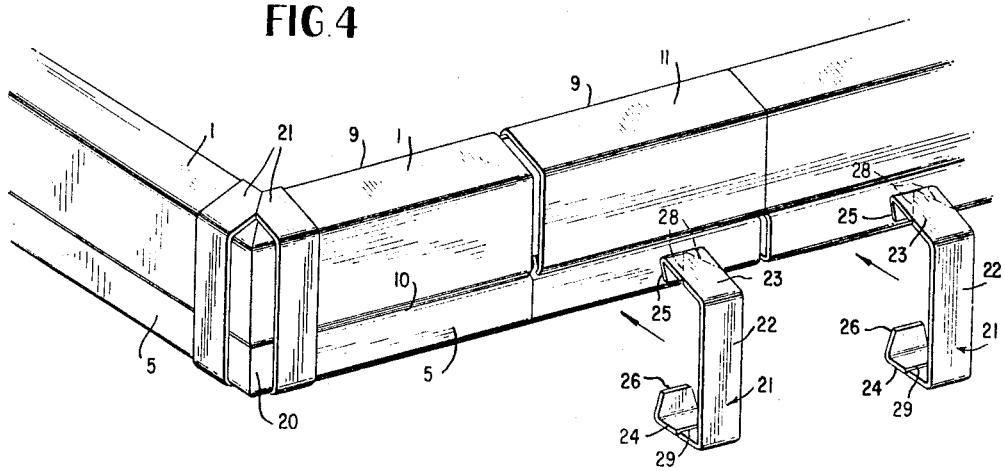
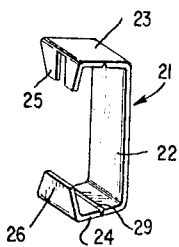
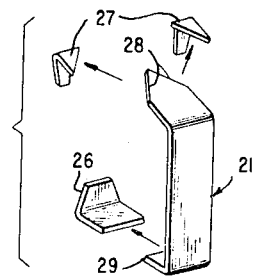
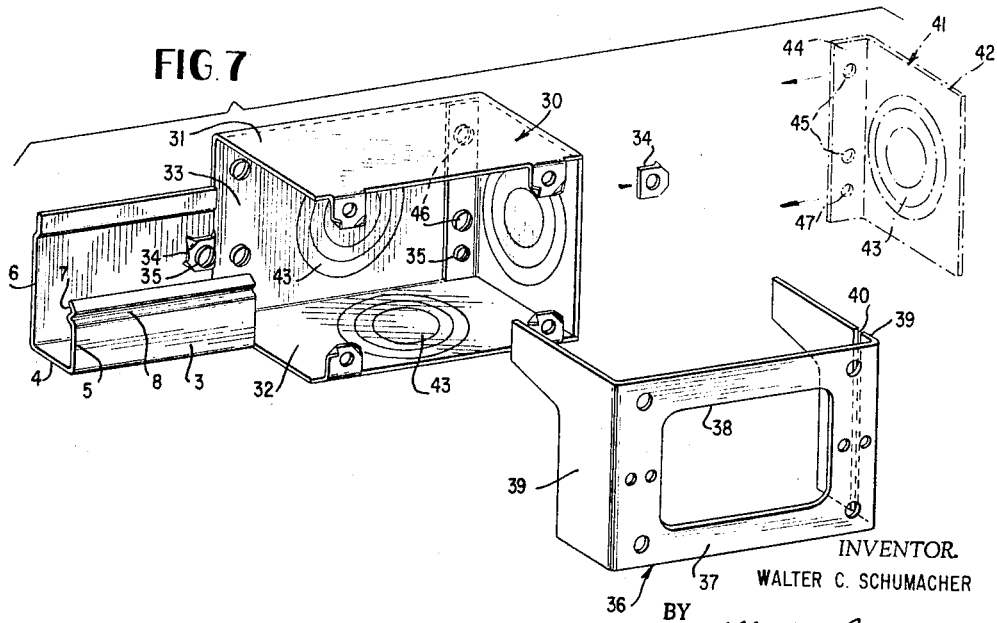
INVENTOR.
WALTER C. SCHUMACHER
BY
*Allard A. Braddock*
ATTORNEY

United States Patent Office 3,281,005
Patented Oct. 25, 1966

3,281,005
SURFACE METAL RACEWAY FITTINGS
Walter C. Schumacher, Providence, R.I., assignor to General Electric Company, a corporation of New York
Filed Jan. 21, 1963, Ser. No. 252,664
2 Claims. (Cl. 220—3.8)

This invention relates to a surface wiring system. More particularly, this invention relates to fittings used in installing an unobtrusive flexible wiring system designed to be installed after completion of a building construction.

Surface raceway units have been developed which are simple in construction and easily installed; however, they come in standard lengths which must be joined together, cut to different lengths and lead around corners in order to provide a complete system. Often it is necessary, or desirable, to utilize branch circuits requiring that T-junctions be made between raceway units. On occasion it is necessary, or desirable, to place a junction box either intermediately of or at the extremity of a raceway system. Prior art fittings for accomplishing such purposes have not been entirely successful.

An object of the present invention is to provide fittings for raceway systems which are easily installed and present a smooth and pleasing surface to the eye.

Another object of the present invention is to provide a versatile arrangement for presenting a pleasing appearance at joints of adjoining sections of a raceway system.

Another object of the present invention is to provide, in a raceway system having raceway units forming branch circuits requiring T-junctions, a face plate for the T-junctions which may be utilized regardless of the orientation of the raceway units.

A further object of the present invention is to provide a raceway system including a junction box which may be utilized either in the interior of or at the extremity of the system.

Further objects and advantages of the invention will become apparent as the following description proceeds and the features of novelty which characterize my invention will be pointed out with particularity in the claims annexed to and forming part of this specification.

The present invention is directed to a raceway system including elongated units joined to form a T-junction. In carrying out the invention in one form thereof, a face plate, having a mounting means operable entirely from the outside, fits over the T-junction so as to present a smooth appearance. Generally C-shaped clips are provided to cover joints between adjacent units as well as between units and corner members. The clips have easily removable ears that extend their usefulness to a number of situations. A junction box is included and has an adapter plate so that the box may be used either internally or at the extremity of the system.

For a better understanding of the invention, reference may be had to the accompanying drawings in which:

FIG. 1 is a perspective view of a raceway system equipped with the fittings of the present invention;

FIG. 2 is a view of a T-junction face plate with the mounting means removed;

FIG. 3 is a sectional view of a raceway channel member showing an attached face plate;

FIG. 4 is a perspective view of a raceway system including an outside corner section having connection clips attached;

FIG. 5 is a perspective view of a connection clip;

FIG. 6 is an exploded perspective view of a connection clip showing the detachable ears removed;

FIG. 7 is an exploded view of a junction box, including a detachable adapter plate.

FIG. 1 illustrates a raceway wiring installation in accordance with this invention wherein a pair of elongated raceway units 1 and 1a are joined in a T-junction 2. Each of the raceway units 1 and 1a comprises a channel member 3 having a base 4, a front side 5 and a rear side 6. Preferably, the rear side 6 is made longer than the front side 5 to facilitate mounting the channel member upon some adjacent surface such as a wall. An outwardly projecting groove 7 and an inwardly projecting groove 8 are formed parallel to the longitudinal axis of front side 5 and adjacent the upper edge thereof.

A cover 9 hooks behind the upper edge of rear side 6 and is provided with an inwardly extending lip 10 which fits into the inwardly projecting groove 8 in the front side 5, thus forming a closed raceway unit 1 or 1a. The raceway units have a generally rectangular cross-sectional configuration, although the top 11 of the cover 9 may be inclined downwardly toward the front for the sake of appearance.

The normal method of forming branch circuits in a raceway system is to provide T-junctions by joining a pair of raceway units in a perpendicular orientation such that one of them extends from the top of the other. It requires a great deal of delicate and time-consuming work in order to cut the channel members 3 and the covers 9 of the two raceway units 1 and 1a to be joined with sufficient accuracy to obtain a relatively smooth fit.

To avoid the necessity of such a tedious and virtually impossible job of cutting the two raceway units, a face plate 12 is provided to cover the T-junction joints. As best shown in FIGS. 2 and 3, the face plate 12 is provided with a flange 13 which extends into the inwardly projecting groove 8 in the raceway unit 1. A pair of angularly extending ears 14 are provided at the corners of the face plate 12 opposite the flange 13 and extend over the top 11 of the cover 9 of the raceway unit 1. Since, in any particular raceway unit, it may be desired to incline the top 11 of the cover 9, each of the ears 14 is provided with a diagonal score line (one of which is shown at 15) so as to accommodate elongated units having either inclined or generally right-angled corners. Where the ear 14 abuts a right-angled wall it is used in the form illustrated. Where it abuts an inclined wall a portion of the ear 14 is broken off along score line 15.

In order to lock the face plate 12 in engagement with the raceway unit 1, the face plate 12 is additionally provided with an aperture 16 for receiving a screw 17 upon which is mounted a lock washer 18. The lock washer 18 is provided with depending legs 19 either or both of which fit into the inner surface of the outwardly projecting groove 7 provided in the front side 5 of the channel member 3 (as best seen in FIG. 3). Although the lock washer 18 has been illustrated with two depending legs, it is obvious that a single leg would be sufficient. The outwardly projecting groove 7 limits movement of the depending legs 19 of the lock washer 18. Therefore, upon tightening the screw 17 the face plate 12 is securely mounted about the T-junction 2 so as to completely close the opening and present a smooth and pleasing appearance to the eye. Thus, the mounting of the face plate 12 over the T-junction 2 can be effected entirely by engagement of a screwdriver with the exposed end of the screw with no necessity for holding the lock washer 18.

FIG. 4 shows a corner section formed from a pair of raceway units 1 joined by means of an outside corner member 20. The junction between each of the raceway units 1 and the outside corner member 20 is covered by a substantially C-shaped clip 21 which is better shown in FIGS. 5–6. The clip 21 is formed with a base section 22 having upper and lower end portions 23 and 24, respectively, disposed generally perpendicular to the base section 22. The upper end portion 23 has a notched ear 25 inwardly extending from its extremity while the lower end portion 24 is provided with a solid ear 26 inwardly extending from its extremity.

It may be noted from FIG. 4 that, when a pair of clips 21 are utilized at an outside corner, they tend to overlap and fail to function properly. In order to avoid this problem, the upper end portion 23 adjacent the notched ear 25 is provided with a V-score 28 and when an individual section 27 of the notched ear 25 is broken off along one side of the V-score 28 (as shown in FIG. 5) the upper end portions 23 will not overlap and therefore will lie smoothly. A similar overlapping problem at the bottom of an outside corner section is solved by providing the lower end portion 24 of each clip 21 with a straight score 29. When the solid ear 26 of each clip 21 used at an outside corner is broken away along the straight score 29 (as shown in FIG. 5) the lower end portions 24 will lie smoothly. In a normal operation the notched ear 25 fits behind the cover 9 while the solid ear 26 is inserted behind channel member 3.

It is obvious that the clips 21 are equally suited to covering the joint between a pair of adjacent raceway units 1 which merely abut in an end-to-end arrangement, as has been illustrated by the inclusion of clips 21 in FIG. 1 and the partially cut-away views in FIG. 4. An additional advantage realized by providing means for easily removing the solid ear 26 is that the clip 21 may be readily utilized with raceway units having their bases mounted so closely adjacent a surface as to prevent the insertion of a clip 21 having a solid ear 26 provided on its lower end portion 24.

FIG. 7 illustrates a junction box 30 for use either intermediately or at the extremity of a raceway system. The junction box comprises a top wall 31 and a bottom wall 32 joined by a back wall 33 which is provided at either end with a grounding tab 34. The tabs 34 are provided with turned down corners 34a which are forced into the rear wall 6 by tightening the screw 35. A closure member 36 having a front wall 37, with an outlet opeinng 38, and end walls 39 completes the basic junction box 30.

In order to permit installation of a junction box at one end of the raceway system, both of the end walls 39 are provided with vertically extending score lines 40, one of which is shown in FIG. 7, to facilitate the removal of a portion of the end wall 39.

If the junction box is to be installed in the interior of the raceway system, the closure member is utilized in its original form, whereas, if it is desired to install the junction box at one end of a raceway system, one of the end walls 39 is broken off along the score line 40 and is replaced by an adapter plate 41. The adapter plate 41 has an end portion 42, with a knock-out section 43, and an attachment portion 44. The attachment portion 44 has attachment screw apertures 45 which are utilized with attachment screws 46 to mount the adapter plate 41 on the back wall 33. Additionally, the attachment portion 44 is provided with a threaded aperture 47 to receive a grounding screw 35 in order to insure that the adapter plate 41 is securely grounded to the back wall 33. The grounding tab 34 provided at the end of the back wall 33 to which the adapter plate 41 is to be attached may, for the sake of appearance, be removed by merely breaking it off, since, when a junction box 30 is mounted at the end of a raceway system, the exposed grounding tab 34 serves no purpose. If it is desired to lead a cable into the raceway system through junction box 30, the knock-out section 43 provided in the adapter plate 41 is merely removed.

Modifications of this invention will occur to those skilled in the art and it is desired to be understood, therefore, that this invention is not to be limited to the particular arrangement disclosed, but that the appended claims are meant to cover all modifications which are within the spirit and scope of this invention.

What I claim as new and desire to secure by Letters Patent of the United States is:

1. In a raceway system having a channel member and a cover member engaging said channel member to form an elongated unit having a generally rectangular cross-sectional configuration, a junction box comprising:
   (a) angularly related back and side walls,
   (b) a closure member comprising angularly related front and end walls,
   (c) a score line in at least one end wall of said closure member whereby at least a portion of said end wall may be easily removed to provide access to the interior of said junction box,
   (d) an adapter plate, and
   (e) means to attach said adapter plate to said junction box at the end from which said portion of the end wall has been removed.

2. In a raceway system having a channel member and a cover member engaging said channel member to form an elongated unit having a generally rectangular cross-sectional configuration, a junction box comprising:
   (a) angular related rear and side walls,
   (b) said rear wall having at least one screw receiving aperture adjacent each end,
   (c) a closure member comprising angularly related front and end walls,
   (d) a score line in at least one end wall of said closure member whereby at least a portion of said end wall may be easily removed to provide access to the interior of said junction box, and
   (e) an L-shaped adapter plate having first and second sides,
   (f) said first side having at least one screw receiving aperture in register with said screw receiving aperture in said rear wall of said junction box for mounting said adapter plate in the end of said junction box from which a scored portion of the end wall has been removed,
   (g) said first side additionally having a threaded aperture to receive a grounding screw which will bear against said rear wall of said junction box,
   (h) said second side having a knock-out section whereby electrical leads may be brought into said junction box.

References Cited by the Examiner

UNITED STATES PATENTS

| | | | |
|---|---|---|---|
| 291,170 | 1/1884 | Edmunds | 174—72 |
| 440,753 | 11/1890 | Bathurst | 174—72 |
| 832,508 | 10/1906 | Slocum | 220—3.94 |
| 855,550 | 6/1907 | Atkinson | 220—3.94 |
| 990,161 | 4/1911 | Paiste | 220—3.94 |
| 1,481,415 | 1/1924 | Casper | 220—3.8 |
| 1,909,136 | 5/1933 | Thomas | 220—3.94 |
| 2,021,492 | 11/1935 | Rutherford | 220—3.8 |
| 2,130,839 | 9/1938 | Conners | 220—3.6 |
| 2,420,184 | 5/1947 | Mekelburg | 220—4 |
| 2,488,710 | 11/1949 | Cooper | 220—3.94 |
| 2,568,983 | 9/1951 | Best | 220—3.92 X |
| 2,596,236 | 5/1952 | Glosier | 220—3.8 |
| 2,620,081 | 12/1952 | Lear | 220—3.8 |
| 2,887,525 | 5/1959 | Lewus | 220—4 X |
| 2,970,678 | 2/1961 | Brinen | 189—85 |
| 3,074,521 | 1/1963 | Woods | 189—85 |

THERON E. CONDON, *Primary Examiner.*

RICHARD W. COOKE, JAMES R. GARRETT,
*Examiners.*

L. R. RADANOVIC, *Assistant Examiner.*